(12) United States Patent
Nakano

(10) Patent No.: US 11,634,328 B2
(45) Date of Patent: Apr. 25, 2023

(54) MAGNET MODULE, PRODUCTION APPARATUS OF NANOCARBON DISPERSION LIQUID USING MAGNET MODULE, AND PRODUCTION METHOD OF NANOCARBON DISPERSION LIQUID

(71) Applicant: BeRyu Co., Ltd., Sakai (JP)

(72) Inventor: Mitsuru Nakano, Sakai (JP)

(73) Assignee: BeRyu Co., Ltd., Sakai (JP)

( * ) Notice: Subject to any disclaimer, the term of this patent is extended or adjusted under 35 U.S.C. 154(b) by 167 days.

(21) Appl. No.: 17/076,407

(22) Filed: Oct. 21, 2020

(65) Prior Publication Data

US 2021/0122637 A1  Apr. 29, 2021

(30) Foreign Application Priority Data

Oct. 24, 2019 (JP) .............................. JP2019-193667

(51) Int. Cl.
*C01B 32/17*    (2017.01)
*C01B 32/174*   (2017.01)
(Continued)

(52) U.S. Cl.
CPC .............. *C01B 32/17* (2017.08); *B03C 1/286* (2013.01); *B03C 1/30* (2013.01); *C01B 32/159* (2017.08);
(Continued)

(58) Field of Classification Search
CPC ..... C01B 32/17; C01B 32/159; C01B 32/174; C01B 2202/02; C01B 32/16; C01B 32/158; C01B 32/162; C01B 32/164; C01B 32/166; C01B 32/168; C01B 32/172; C01B 32/176; C01B 32/178; C01B 2202/00;
(Continued)

(56) References Cited

U.S. PATENT DOCUMENTS 8,556,494 B2   10/2013 Nakano
2008/0017564 A1* 1/2008 Hammond ............. B01D 35/06
                                                      210/695
(Continued)

FOREIGN PATENT DOCUMENTS

CN   207187967 U    4/2018
JP   S4521598 Y1   8/1970
(Continued)

OTHER PUBLICATIONS

Kim, et al., Purifcation of Pulsed Laser Synthesized Single Wall Carbon Nanotubes by Magnetic Filtration, J. Phys. Chem. B 2005; 109L: 16636-16643 (Year: 2005).*

(Continued)

*Primary Examiner* — Daniel C. McCracken

(74) *Attorney, Agent, or Firm* — Studebaker & Brackett PC

(57) ABSTRACT

A magnet module used for producing a carbon nanotube dispersion liquid, comprising: a pipe portion having a first opening connected to a shearing module, and a second opening at both ends; and a magnet disposed in the pipe portion, wherein a medium liquid containing the carbon nanotube defibrated by the shearing module is supplied through the first opening, and after a ferromagnetic impurity attached to the carbon nanotube is attracted to the magnet and removed, the medium liquid is discharged from the second opening.

15 Claims, 7 Drawing Sheets

(51) Int. Cl.
  *B03C 1/28* (2006.01)
  *B03C 1/30* (2006.01)
  *C01B 32/159* (2017.01)

(52) U.S. Cl.
  CPC ........ *C01B 32/174* (2017.08); *C01B 2202/02* (2013.01)

(58) Field of Classification Search
  CPC ............ C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; B03C 1/286; B03C 1/30; B03C 2201/18; B03C 1/00; B03C 1/02; B03C 1/28; B03C 1/284; B03C 1/288; B03C 1/32; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133
  See application file for complete search history.

(56) References Cited

U.S. PATENT DOCUMENTS

| | | | |
|---|---|---|---|
| 2009/0171106 A1 | 7/2009 | Virtanen et al. | |
| 2011/0042276 A1* | 2/2011 | Miller | B03C 1/28 209/8 |
| 2014/0199229 A1* | 7/2014 | Strano | B82Y 40/00 423/447.2 |
| 2020/0061563 A1 | 2/2020 | Nakano | |

FOREIGN PATENT DOCUMENTS

| | | | | |
|---|---|---|---|---|
| JP | S50-90274 U | * | 7/1975 | ............... B03C 1/12 |
| JP | S5090274 U | | 7/1975 | |
| JP | 2002-309122 A | | 10/2002 | |
| JP | 2009207972 A | | 9/2009 | |
| JP | 2010-174418 A | | 8/2010 | |
| JP | 2010253415 A | | 11/2010 | |
| JP | 5791142 B2 | | 10/2015 | |
| JP | 5972434 B2 | | 8/2016 | |
| JP | 6585250 B1 | | 10/2019 | |

OTHER PUBLICATIONS

Wiltshire, et al., Magnetic separation of Fe catalyst from single-walled carbon nanotubes in an aqueous surfactant solution, Carbon 2005; 43: 11511-1155 (Year: 2005).*

An Office Action mailed by the Japanese Patent Office dated Mar. 23, 2021, which corresponds to Japanese Patent Application No. 2019-193667 and is related to U.S. Appl. No. 17/076,407.

* cited by examiner

MAGNET MODULE, PRODUCTION APPARATUS OF NANOCARBON DISPERSION LIQUID USING MAGNET MODULE, AND PRODUCTION METHOD OF NANOCARBON DISPERSION LIQUID

BACKGROUND OF THE INVENTION

Field of the Invention

The present invention relates to a magnet module used for producing a nanocarbon dispersion liquid (suspension, emulsion), a production apparatus of a nanocarbon dispersion liquid using the magnet module, and a production method of a nanocarbon dispersion liquid.

Description of the Related Art

As a method for defibrating and dispersing single-walled carbon nanotubes (hereinafter, referred to as "SWCNTs") and producing a nanocarbon dispersion liquid, for example, a method for applying shear stress to defibrate SWCNTs by pressurizing and introducing a solution containing the SWCNTs into a thin pipe has been proposed (see, for example, Japanese Patent No. 6585250). The defibration of SWCNTs depends on an amount of shear stress applied to the SWCNTs when the SWCNTs pass through the thin pipe. In other words, the defibration depends on how small an inner diameter of the pipe is and how fast the SWCNs passes through the pipe.

SUMMARY OF THE INVENTION

However, when the inner diameter of the pipe is reduced to less than 0.2 mm in order to increase the shear stress and promote the defibration, the SWCNTs are clogged in the pipe and sufficient shear stress cannot be applied, resulting in insufficient defibration. It has been found that such pipe clogging occurs in SWCNTs produced by a high pressure carbon monoxide (HiPCO) method of reacting carbon monoxide with $Fe(CO)_5$ as a catalyst precursor, while pipe clogging does not occur in SWCNTs produced by a super growth method. The inventors have found that substances that cause the clogging are iron, which is a catalyst precursor mixed in the SWCNTs due to the HiPCO method, and carbon nanotube (CNT) aggregates, and have completed the present invention.

That is, an object of the present invention is to provide an inexpensive and highly reliable nanocarbon dispersion liquid (suspension, emulsion) by defibrating and dispersing carbon nanotubes by using a magnet module, a production apparatus of a nanocarbon dispersion liquid using the magnet module, and a production method of a nanocarbon dispersion liquid.

One aspect of the present invention is a magnet module used for producing a carbon nanotube dispersion liquid, the magnet module including:

a pipe portion having a first opening connected to a shearing module, and a second opening at both ends; and a magnet disposed in the pipe portion, in which a medium liquid containing the carbon nanotube defibrated by the shearing module is supplied through the first opening, and after a ferromagnetic impurity attached to the carbon nanotube is attracted to the magnet and removed, the medium liquid is discharged from the second opening.

Another aspect of the present invention is a production apparatus of a nanocarbon dispersion liquid, the production apparatus including:

a magnet module; and a shearing module connected to a first opening of the magnet module, in which the carbon nanotube in the medium liquid is supplied to the magnet module from the first opening after being defibrated in the shearing module, and is discharged from a second opening after a ferromagnetic impurity attached to the carbon nanotube is attracted to the magnet and removed.

Further, another aspect of the present invention is a production method of a nanocarbon dispersion liquid, the production method including the steps of:

preparing a mixed liquid containing a carbon nanotube and a medium liquid;

defibrating the carbon nanotube by applying shear stress to the carbon nanotube; and removing a ferromagnetic impurity in the mixed liquid by attracting the impurity to a magnet.

As described above, by using a magnet module, a production apparatus of a nanocarbon dispersion liquid including the magnet module, and a production method of a nanocarbon dispersion liquid according to the present invention, carbon nanotubes can be sufficiently defibrated in a relatively simple process, and an inexpensive and highly reliable nanocarbon dispersion liquid can be obtained.

DETAILED DESCRIPTION OF THE PREFERRED EMBODIMENTS

<Production Apparatus of Nanocarbon Dispersion Liquid>

Figure 1:
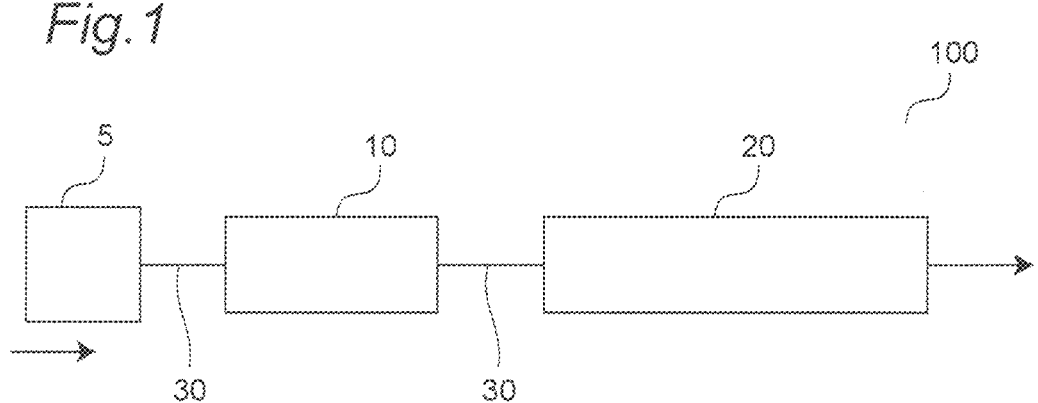
FIG. 1 is a schematic diagram of a nanocarbon dispersion apparatus according to an embodiment of the present invention.

FIG. 1 is a schematic diagram of a production apparatus of a nanocarbon dispersion liquid according to an embodiment of the present invention, which is wholly represented by 100. The production apparatus 100 includes a high-pressure pump 5, a shearing module 10, and a magnet module 20, which are connected in series by a pipe 30. An arrow in FIG. 1 indicates a moving direction of a fluid (same applies to the following figures).

The nanocarbon dispersion liquid includes both a nanocarbon suspension and a nanocarbon emulsion. Therefore, the production apparatus 100 of a nanocarbon dispersion liquid can be used for producing a nanocarbon suspension and a nanocarbon emulsion.

The shearing module 10 is, for example, a pipe having an inner diameter of 0.2 mm and a length of 8 mm. The shearing module 10 may have a structure in which shear stress acts on a sample passing through the shearing module 10, and for example, as shown in FIG. 2, an emulsification dispersion apparatus 50 described in Japanese Patent No. 5791142 or Japanese Patent No. 5972434 by the same applicant may be used.

Figure 2:
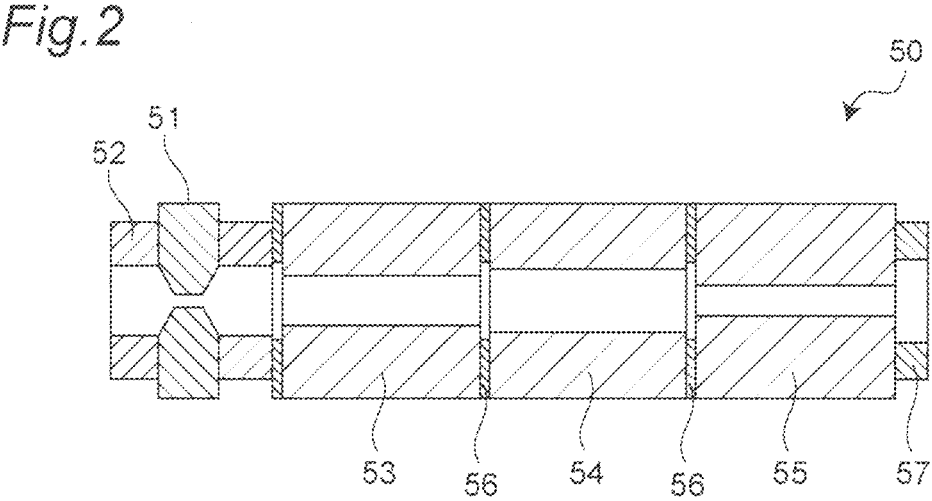
FIG. 2 is a cross-sectional view of an emulsification dispersion apparatus used in the nanocarbon dispersion apparatus according to the embodiment of the present invention.

As shown in FIG. 2, in the emulsification dispersion apparatus 50, between an inlet-side pipe 52 provided with a nozzle portion 51 and an outlet-side pipe 57, a first fine hole member 53, a second fine hole member 54, and a third fine hole member 55 are provided. A seal member 56 is provided between the fine hole members. When inner diameters of the first fine hole member 53, the second fine hole member 54, and the third fine hole member 55 are $d_1$, $d_2$, and $d_3$, a relationship of $d_2 > d_1 > d_3$ is satisfied.

Figure 3:
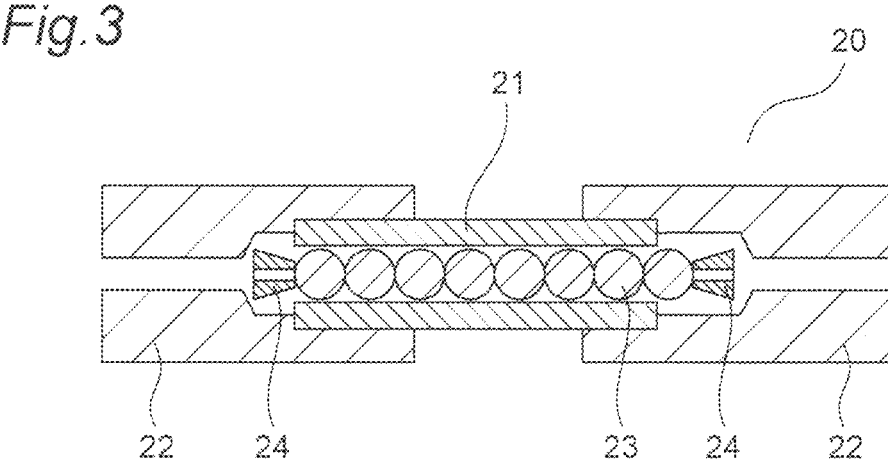
FIG. 3 is a cross-sectional view of a magnet module used in the nanocarbon dispersion apparatus according to the embodiment of the present invention.

As shown in FIG. 3, the magnet module 20 connected to a latter stage of the shearing module 10 includes a tubular pipe portion 21 having openings at both ends and cap portions 22 provided at both ends of the pipe portion 21. A plurality of spherical magnets 23 is inserted in the pipe portion 21. An inner diameter of each cap portion 22 is smaller than a diameter of each magnet 23. This prevents the magnet 23 from rolling out of the magnet module 20.

An inner diameter of the pipe portion 21 is designed to be slightly larger than the diameter of the magnet 23. Accordingly, the plurality of magnets 23 is arranged in a line in the pipe portion 21, and each magnet 23 can move freely. For example, the magnet 23 has a diameter of 3.0 mm and the pipe portion 21 has an inner diameter of 3.1 mm. A length of the pipe portion 21 is 800 mm, for example.

It is also possible to make the inner diameter of the pipe portion 21 sufficiently larger than the diameter of the magnet 23 so that an inside of the pipe portion 21 is filled with the plurality of magnets 23 not being arranged in a line.

Retainers 24 are inserted into both ends of the magnet 23, respectively. Each retainer 24 has a through hole and is made of a member whose outer diameter on a side of the cap portion 22 is larger than an inner diameter of a hole of the cap portion 22.

Figure 4A:
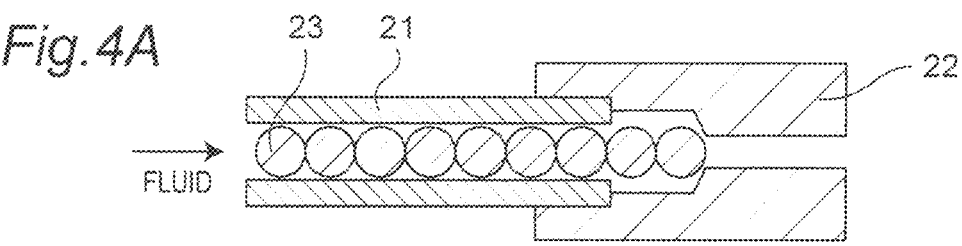
FIGS. 4A to 4C are cross-sectional views showing how a magnet moves in the magnet module.
Figure 4B:
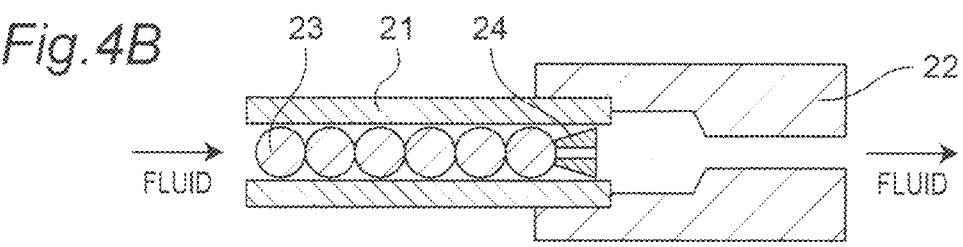
Figure 4C:
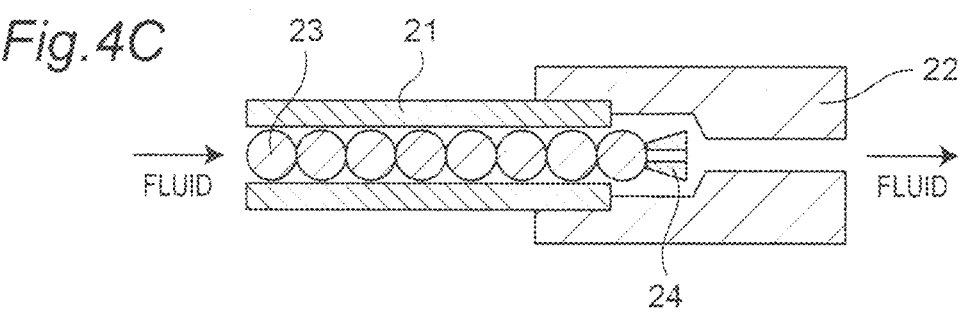

As shown in FIG. 4A, when a fluid flows from left to right, without the retainer 24, the magnet 23 closes the hole in the cap portion 22 and the fluid stops flowing. On the other hand, by providing the retainer 24, when the fluid flows from left to right as shown in FIG. 4B, the magnet 23 is pushed by the fluid and moves to the right, but as shown in FIG. 4C, since the retainer 24 having the through hole serves as a spacer between the cap portion 22 and the magnet 23, the magnet 23 does not close the hole of the cap portion 22. The retainer 24 inclines vertically and horizontally from a position shown in FIG. 4C, and a fluid path can be secured around the retainer 24.

Figure 5A:
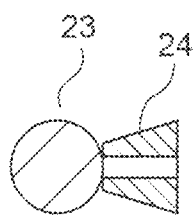
FIGS. 5A to 5B are cross-sectional views of a retainer used in the magnet module.
Figure 5B:
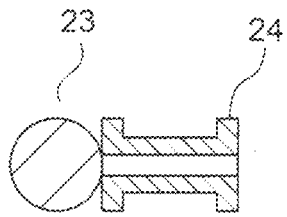

FIGS. 5A and 5B are cross-sectional views of the retainer 24, showing an example of the retainer 24. Each figure shows the magnet 23 on a left side and the cap portion (not shown) on a right side. The retainer 24 in each figure has a through hole through which a fluid passes, and an outer diameter on the right side is larger than the inner diameter of the hole of the cap portion (not shown). The retainer 24 is not limited to the shapes shown in FIGS. 5A and 5B as long as the retainers 24 serves as a spacer that can secure a fluid path by separating the magnet 23 and the cap portion 22.

Figure 6:
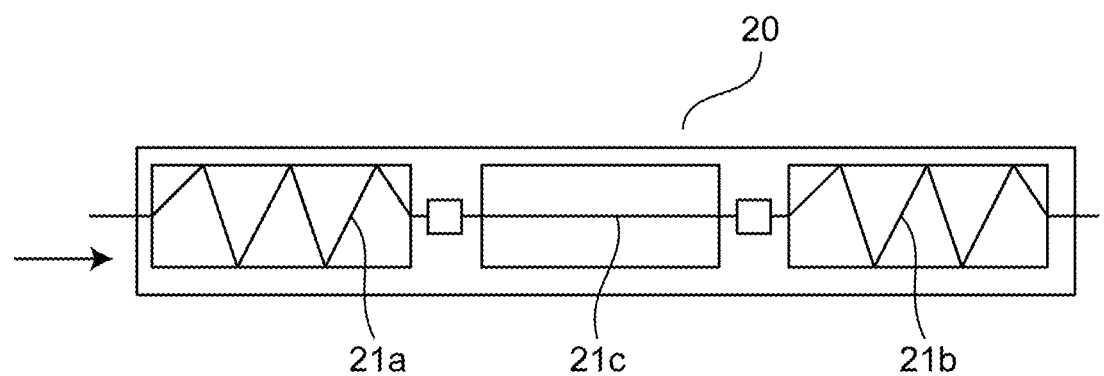
FIG. 6 is a schematic view of the magnet module.
Figure 7:
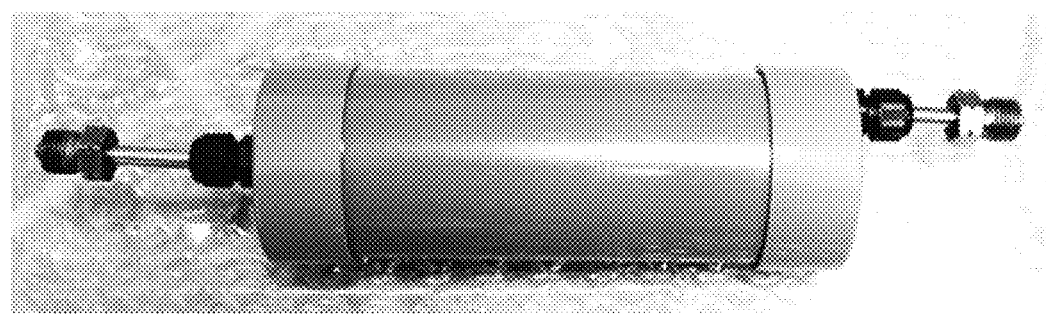
FIG. 7 is a photograph of a real magnet module.

FIG. 6 is a schematic diagram showing an example of the magnet module 20, and FIG. 7 is a photograph of an appearance thereof. In the magnet module 20 of FIG. 6, a right-handed pipe portion 21a and a left-handed pipe portion 21b are connected in series by a linear pipe portion 21c. Here, the right-handed pipe portion 21a is right-handed (clockwise winding) when viewed from an upstream of the fluid (when viewed from the left side in FIG. 6). On the contrary, the left-handed pipe portion 21b is left-handed (counterclockwise winding) when viewed from the upstream of the fluid.

Figure 8:
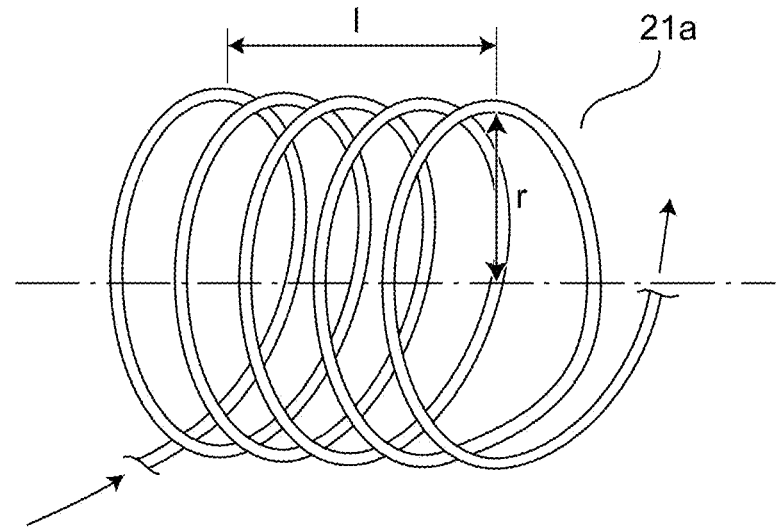
FIG. 8 is a perspective view of a right-handed pipe portion of the magnet module.

FIG. 8 is a perspective view of the right-handed pipe portion 21a, where the left side of FIG. 8 is the upstream and the right side is the downstream. Even in the structure in which the pipe portions 21a and 21b are wound, the plurality of magnets 23 is arranged in a line in the pipe portions 21a and 21b, and each magnet 23 can move freely. For example, the magnet 23 has a diameter of 3.0 mm, the pipe portions 21a and 21b each have an inner diameter of 4.35 mm, a length 1 of 40 mm, and a radius r of 15 mm.

In the right-handed pipe portion 21a, the magnet 23 inside the pipe portion 21a rotates clockwise when viewed in a direction from the upstream to the downstream of the fluid. As a result, the fluid is subjected to a clockwise magnetic field and transverse shear stress to the right. Similarly, in the left-handed pipe portion 21b, the magnet 23 inside the pipe portion 21b rotates counterclockwise when viewed in the direction from the upstream to the downstream of the fluid. As a result, the fluid is subjected to a counterclockwise magnetic field and a transverse shear stress to the left.

By changing a winding method of the right-handed pipe portion 21a and the left-handed pipe portion 21b, for example, a number of windings per unit length, a winding diameter, etc., a direction of the magnetic field applied to the fluid passing through the pipe portion 21 and a direction of the shear stress can be controlled. This makes it possible to control chirality of defibrated SWCNTs.

On the other hand, when the pipe portion is straight as shown in FIG. 3, the magnet 23 does not rotate in a fixed direction, and the direction of the magnetic field and a direction of receiving the transverse shear stress are the direction of the flowing fluid (longitudinal direction of the pipe portion).

In the production apparatus 100 of a nanocarbon dispersion liquid, the carbon nanotubes in the medium liquid supplied in the shearing module 10 by using the high-pressure pump 5 passes through the magnet module 20 after being defibrated by shearing force in the shearing module 10.

As will be described later, the defibrated carbon nanotubes enter the magnet module 20, and ferromagnetic impurities attached to the carbon nanotubes are attracted to the magnet and removed. When the carbon nanotubes entangled with the impurities are defibrated, the impurities are easily separated from the carbon nanotubes, and the impurities are attracted to the magnet in the magnet module 20 and removed.

The sample discharged from the magnet module 20 may be caused to pass through the shearing module 10 and the magnet module 20 again using the high-pressure pump 5. In this way, the impurities in the sample can be further removed by passing through the shearing module 10 and the magnet module 20 a plurality of times.

Figure 9:
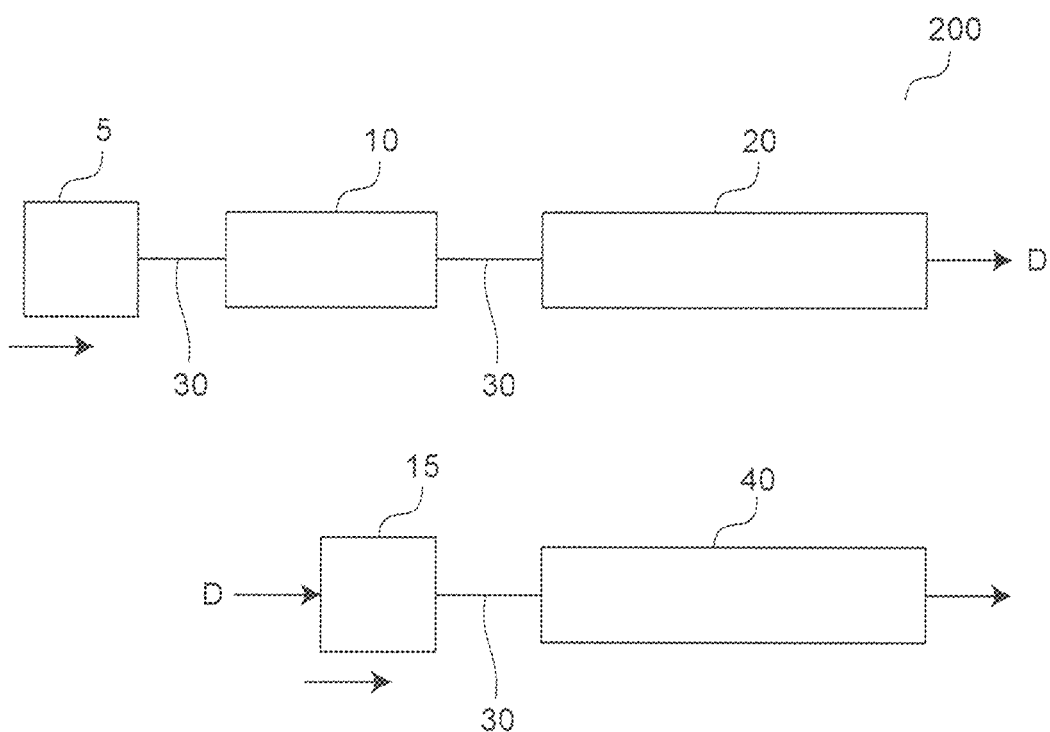
FIG. 9 is a schematic diagram of another nanocarbon dispersion apparatus according to the embodiment of the present invention.

On the other hand, FIG. 9 is a schematic diagram of another production apparatus of a nanocarbon dispersion liquid according to the embodiment of the present invention, which is wholly represented by 200. The same reference numerals as those in FIG. 1 indicate the same or corresponding portions.

Carbon nanotubes in a medium liquid supplied to the shearing module 10 by using the high-pressure pump 5 are defibrated by the shearing force in the shearing module 10 and then enter the magnet module 20. After impurities are attracted to a magnet of the magnet module 20 and removed, the medium liquid is discharged as a sample D from the magnet module 20.

The sample D is supplied to a shearing module 40 by a high-pressure pump 15. An inner diameter of the shearing module 40 is smaller than the inner diameter of the shearing module 10, and is for example, a pipe having an inner diameter of 0.15 mm and a length of 8 mm. By passing through the shearing module 40, the carbon nanotubes in the sample D are further defibrated, and a nanocarbon dispersion liquid can be obtained.

For example, the shearing module 10 has an inner diameter of 0.20 mm or more, for example, 0.20 mm to 0.25 mm, and the shearing module 40 has an inner diameter of 0.15 mm or less, for example, 0.15 mm to 0.10 mm.

The emulsification dispersion apparatus 50 may be used as the shearing modules 10 and 40 as shown in FIG. 2.

Further, the high-pressure pump 5 may be used to pass the medium liquid through the shearing module 10 and the magnet module 20 a plurality of times, and the high-pressure pump 15 may be used to pass the medium liquid through the shearing module 40 a plurality of times.

In this way, by using the magnet module and the production apparatus of a nanocarbon dispersion liquid using the magnet module according to the embodiment of the present invention, carbon nanotubes are sufficiently defibrated, ferromagnetic impurities can be removed, and a nanocarbon dispersion liquid in which carbon nanotubes are dispersed in a medium liquid can be obtained. In particular, with the production apparatus according to the embodiment of the present invention, it is possible to defibrate carbon nanotubes and remove impurities with a relatively simple structure, and obtain an inexpensive and highly reliable nanocarbon dispersion liquid.

<Production Method of Nanocarbon Dispersion Liquid>

A production method of a nanocarbon dispersion liquid according to the embodiment of the present invention will be described using the production apparatus 200 of a nanocarbon dispersion liquid in FIG. 9. This production method includes the following steps 1 to 5. Here, a production method of a nanocarbon suspension will be described as an example.

Step 1: Preparation of Mixed Liquid

A mixed liquid is prepared from the following materials.

Dispersion material: 0.6 g of SWCNT (trade name "Tuball", manufactured by OSCAL, produced by an HiPCO method using iron as a catalyst)

Medium liquid: 125 g of water

Thickener: 0.3 g of sodium carboxymethyl cellulose (CMC)

The thickener may not be added. In addition to water, methanol, ethanol or the like can be used as the medium liquid.

Step 2: Pressurization

The mixed liquid is pressurized and injected from the high-pressure pump 5 into the shearing module 10. Pressure for pressurizing the mixed liquid is, for example, 50 to 70 MPa.

Step 3: Defibration 1

By passing the mixed liquid through the shearing module 10, the SWCNTs in the mixed liquid are defibrated in the shearing module 10. The shearing module 10 is composed of a pipe having an inner diameter of 0.2 mm, for example. When the mixed liquid passes through the pipe at high pressure, transverse shear stress (shear stress in the moving direction of the fluid) acts on the mixed liquid. As a result, the SWCNTs are defibrated.

As the shearing module 10, the emulsification dispersion apparatus 50 shown in FIG. 2 may be used. In the emulsification dispersion apparatus 50, the inner diameters $d_1$, $d_2$, and $d_3$ of the first to third fine hole members 53, 54, and 55 satisfy the relationship of $d_2>d_1>d_3$, and a minimum inner diameter $d_3$ is 0.2 mm.

Step 4: Removing Ferromagnetic Impurities

The mixed liquid that has passed through the shearing module 10 is introduced into the magnet module 20 and passes therethrough. The magnet module 20 includes the right-handed pipe portion 21a and the left-handed pipe portion 21b that are spirally wound. The mixed liquid is subjected to a clockwise magnetic field and transverse shear stress to the right in the right-handed pipe portion 21a, a counterclockwise magnetic field and transverse shear stress to the left in the left-handed pipe portion 21b. As a result, from the SWCNTs defibrated in the shearing module 10, iron due to the catalyst of the HiPCO method and carbon aggregates attached to the iron are attracted to the magnet 23 and removed.

When the SWCNTs are defibrated in step 3, iron lumps entangled in the SWCNTs are easily separated from the SWCNTs, and pass through the magnet module 20 so as to be adsorbed by the magnet 23 and removed from the SWCNTs.

When the right-handed or left-handed pipe portion is compared with a straight pipe portion, the former recovers more iron than the latter. It is considered that the magnet 23 spin-rotates in the right-handed or left-handed pipe portion and thus the amount of recovery is increased.

Step 5: Defibration 2

The mixed liquid is caused to pass through the shearing module 40 having an inner diameter smaller than that of the shearing module 10. The shearing module 40 is composed of, for example, a pipe (nozzle) having an inner diameter of 0.15 mm, but the emulsification dispersion apparatus 50 having a minimum inner diameter $d_3$ of 0.15 mm may be used.

The high-pressure pump 15 is used to pressurize the mixed liquid to 100 MPa, for example, so as to be introduced to the shearing module 40. The SWCNTs in the mixed liquid are further subjected to the shear stress to be defibrated, whereby the nanocarbon dispersion liquid containing the sufficiently defibrated SWCNTs is discharged from the shearing module 40.

The inner diameter of the shearing module 40 may be smaller than 0.15 mm. The smaller the inner diameter, the larger the shear stress applied to the mixed liquid, and the more fibrillated the SWCNTs are. Further, a shearing module having a smaller inner diameter (for example, inner diameter of 0.1 mm) may be provided on a downstream side of the shearing module 40.

By repeating steps 1 to 4 a plurality of times, it is possible to further defibrate the SWCNTs and remove more ferromagnetic impurities. Further, step 5 may be repeated a plurality of times. Further, after repeating steps 1 to 4 a plurality of times, step 5 may be repeated a plurality of times.

Figure 10:
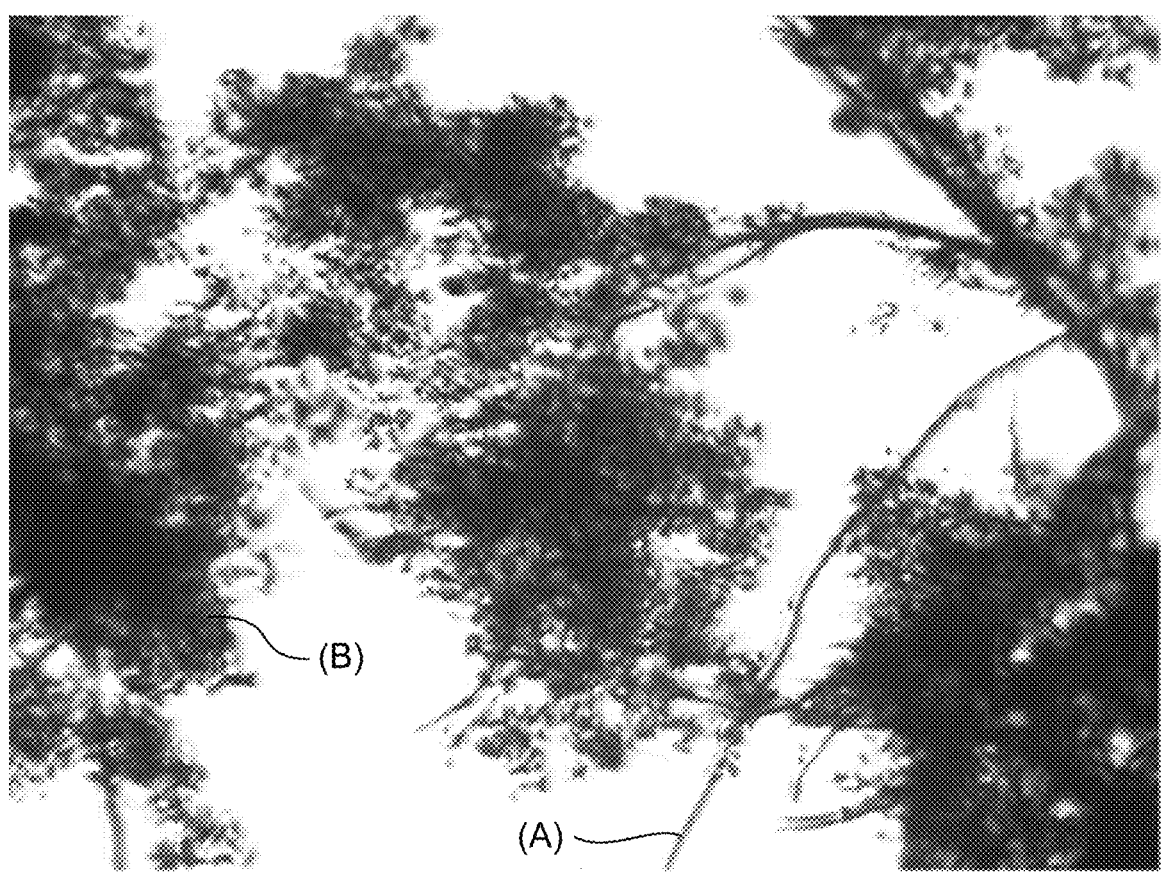
FIG. 10 is a photograph of SWCNTs in a mixed liquid prepared in step 1.
Figure 11:
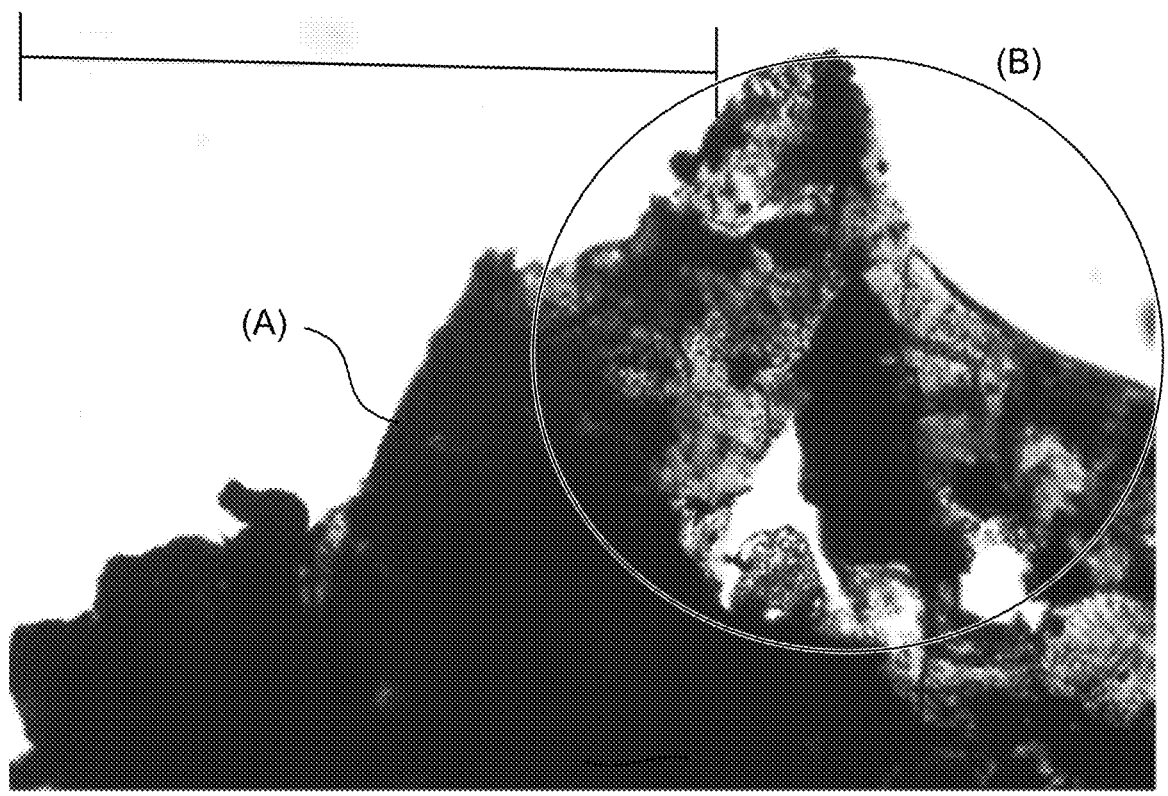
FIG. 11 is an enlarged photograph of the SWCNTs in FIG. 10.
Figure 12:
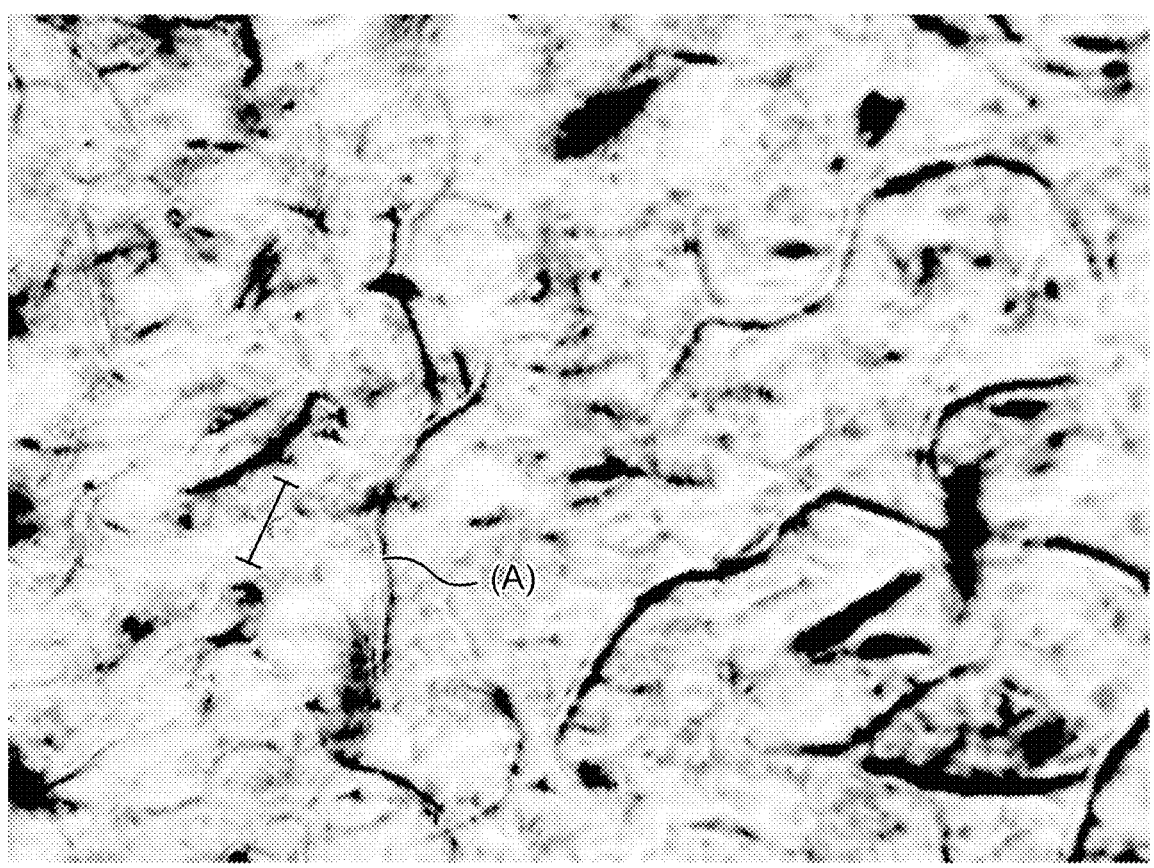
FIG. 12 is a photograph of a nanocarbon dispersion liquid produced by a production method according to the embodiment of the present invention.

FIGS. 10 to 12 are photomicrographs of SWCNTs in the process for producing a nanocarbon dispersion liquid. FIG. 10 shows SWCNTs in the mixed liquid prepared in step 1, and entangled SWCNTs (A) and a lump portion (B) of foreign matters are seen.

FIG. 11 is an enlarged photograph of FIG. 10, and is an enlarged view of the lump portion (B) of foreign matters attached to the SWCNTs (A). A black part is the SWCNTs (A), and a semitransparent part is the lump portion (B) of foreign matters. In the lump portion (B), a light-colored part is considered to be iron due to the catalyst used in the HiPCO method, and a dark-colored part (black part) is considered to be carbon due to the carbon nanotubes (for example, carbon of diamond structure).

A scale in FIG. 11 represents 100 μm (0.1 mm), and a size of the lump of foreign matters is about 0.1 mm. Such a lump portion passes through a shearing module having an inner diameter of about 0.2 mm, but the lump portion may be clogged in the shearing module having an inner diameter of 0.15 mm or less.

FIG. 12 is a photomicrograph of the nanocarbon dispersion liquid produced in steps 1 to 5 using the nanocarbon dispersion production apparatus 200. A scale shown in FIG. 12 is 1.0 μm (0.001 mm). FIG. 12 shows that the lump portion is removed and the SWCNTs (A) are sufficiently defibrated.

Here, the production method by performing steps 1 to 5 using the production apparatus 200 of a nanocarbon dispersion liquid in FIG. 9 has been described. However, only steps 1 to 4 may be performed using the production apparatus 100 of a nanocarbon dispersion liquid in FIG. 1. In this case as well, the SWCNTs can be defibrated to remove the ferromagnetic impurities so as to obtain a nanocarbon dispersion liquid.

In the embodiment of the present invention, SWCNTs produced by the HiPCO method using iron as a catalyst are used, but SWCNTs produced by a fixed layer chemical vapor deposition (CVD) method using cobalt as a catalyst may be used instead. In this case, the lump attached to the SWCNTs is cobalt instead of iron, but since cobalt is a ferromagnetic material like iron, cobalt can be removed by using of the magnet module 20.

As described above, by using the production method of a nanocarbon dispersion liquid according to the embodiment of the present invention, it is possible to sufficiently defibrate the carbon nanotubes, and a nanocarbon dispersion liquid can be obtained in which the carbon nanotubes are dispersed in the medium liquid. In particular, in the production method according to the embodiment of the present invention, it is possible to defibrate carbon nanotubes and remove impurities in a relatively simple process, and obtain an inexpensive and highly reliable nanocarbon dispersion liquid.

<Material 1>

When a carbon nanotube suspension is prepared, the following mixed liquids may be used as a material instead of the above SWCNTs+a medium liquid+a thickener.

(1) SWCNTs+Graphite+a Medium Liquid (+a Thickener)

An addition of graphite improves wetting and slippage. As a result, for example, in the above step 5 (defibration step 2) using a shearing module having an inner diameter of 0.15 mm, the mixed liquid easily passes through the shearing module, and good defibration of SWCNTs can be performed. In particular, this mixed liquid is effective when the mixed liquid contains carbon lumps that cannot be removed by the magnet module (for example, diamond).

For example, a mixed liquid having the following composition is used.
Dispersion material: 0.6 g of SWCNT
Graphite: 0.6 g
Medium liquid: 125 g of water
Thickener: 0.3 g of sodium carboxymethyl cellulose (CMC)
The thickener may not be added.

(2) SWCNTs+Graphite+Multi-Walled Carbon Nanotubes (MWCNTs)+a Medium Liquid (+a Thickener)

The addition of graphite and MWCNTs improves wetting and slippage, and good defibration of SWCNTs can be performed in the above step 5 (defibration step 2).

For example, a mixed liquid having the following composition is used.
Dispersion material: 0.6 g of SWCNT
Graphite: 0.6 g
MWCNT: 0.6 g
Medium liquid: 125 g of water
Thickener: 0.3 g of sodium carboxymethyl cellulose (CMC)
The thickener may not be added.

(3) SWCNTs+Graphite+Oil+a Medium Liquid (+a Thickener)

The addition of graphite and oil improves wetting and slippage, and good defibration of SWCNTs can be performed in the above step 5 (defibration step 2). Since oil reduces conductivity of SWCNTs as an impurity, a small amount is preferable.

For example, a mixed liquid having the following composition is used.
Dispersion material: 0.6 g of SWCNT
Graphite: 0.6 g
Oil: small amount (0.01 wt % to 10 wt %)
Medium liquid: 125 g of water
Thickener: 0.3 g of sodium carboxymethyl cellulose (CMC)
The thickener may not be added.

(4) SWCNTs+Graphite+MWCNTs+Oil+a Medium Liquid (+a Thickener)

The addition of graphite, MWCNTs, and oil improves wetting and slippage, and good defibration of SWCNTs can be performed in the above step 5 (defibration step 2). Since oil reduces conductivity of SWCNTs as an impurity, a small amount is preferable.

For example, a mixed liquid having the following composition is used.
Dispersion material: 0.6 g of SWCNT
Graphite: 0.6 g
MWCNT: 1.8 g
Oil: small amount (0.01 wt % to 10 wt %)
Medium liquid: 125 g of water
Thickener: 0.3 g of sodium carboxymethyl cellulose (CMC)
The thickener may not be added.

(5) Other

By using MWCNTs instead of SWCNTs as the dispersion material, a nanocarbon dispersion liquid containing defibrated MWCNTs can be obtained.

<Material 2>

When a carbon nanotube emulsion is produced, a mixed liquid containing a medium liquid and an emulsification dispersion material that is insoluble in the medium liquid is used as a material, for example, as described in Japanese Patent No. 6585250. Specifically, for example, a mixed liquid having the following composition is used.

Medium liquid: 125 g of water
Emulsification dispersion material: 5 g of liquid paraffin
Emulsifier: 0.3 g of thin film graphite
0.6 g of multi-walled carbon nanotube (MWCNT)
Thickener: Carboxymethyl cellulose By performing steps 1 to 4 or steps 1 to 5 on such a mixed liquid, ferromagnetic impurities can be removed from the defibrated MWCNTs, and a highly pure nanocarbon emulsion can be obtained. In particular, by removing the impurities, the shearing module 40 having a small inner diameter can pass through in step 5, and more of the MWCNTs can be defibrated such that aggregation of thin film graphite can be further prevented.

Even when the mixed liquid consists of a medium liquid, an emulsification dispersion material, and carbon nanotubes, and does not contain a thickener or emulsifier, by passing the mixed liquid through the production apparatus 100 or 200 of a nanocarbon dispersion liquid, an emulsion dispersed in the medium liquid can be obtained while the emulsification dispersion material is surrounded by the carbon nanotubes.

The nanocarbon dispersion liquid according to the present invention can be used as cosmetics and foods that come into contact with a human body, lubricants for machines, battery materials, and conductive paints.

What is claimed is:

1. A magnet module used for producing a carbon nanotube dispersion liquid, the magnet module comprising:
    a pipe portion having a first opening connected to a shearing module, and a second opening at both ends; and
    a magnet disposed in the pipe portion,
    wherein the pipe portion includes a right-handed pipe portion spirally wound and/or a left-handed pipe portion spirally wound.

2. The magnet module according to claim 1, wherein the magnet is a plurality of spherical magnets each having a diameter smaller than an inner diameter of the pipe portion and arranged in a line in a longitudinal direction of the pipe portion.

3. The magnet module according to claim 1, further comprising a retainer between the second opening and the magnet.

4. A production method of a nanocarbon dispersion liquid, the production method comprising the steps of:
    preparing a mixed liquid containing a carbon nanotube and a medium liquid;
    defibrating the carbon nanotube by applying shear stress to the carbon nanotube; and
    removing a ferromagnetic impurity in the mixed liquid by attracting the impurity to a magnet,
    wherein the mixed liquid is selected from the group consisting of:
    a single-walled carbon nanotube (SWCNT) and a medium liquid;
    an SWCNT, graphite, and a medium liquid;
    an SWCNT, graphite, a multi-walled carbon nanotube (MWCNT), and a medium liquid;
    an SWCNT, graphite, oil, and a medium liquid; and
    an SWCNT, graphite, an MWCNT, oil, and a medium liquid, and
    wherein the mixed liquid further comprises a thickener.

5. The production method according to claim 4, wherein a set of the defibrating step and the removing step is repeated twice or more.

6. The production method according to claim 4, further comprising a step of defibrating the carbon nanotube by applying shear stress to the carbon nanotube after the removing step.

7. The production method according to claim 4, wherein the ferromagnetic impurity of is iron or cobalt.

8. A production method of a nanocarbon dispersion liquid, the production method comprising the steps of:
    preparing a mixed liquid containing a carbon nanotube and a medium liquid;
    defibrating the carbon nanotube by applying shear stress to the carbon nanotube; and
    removing a ferromagnetic impurity in the mixed liquid by attracting the impurity to a magnet,
    wherein the mixed liquid is selected from the group consisting of:
    an MWCNT and a medium liquid;
    an MWCNT, graphite, and a medium liquid; and
    an MWCNT, graphite, oil, and a medium liquid, and
    wherein the mixed liquid further comprises a thickener.

9. The production method according to claim 8, wherein a set of the defibrating step and the removing step is repeated twice or more.

10. The production method according to claim 8, further comprising a step of defibrating the carbon nanotube by applying shear stress to the carbon nanotube after the removing step.

11. The production method according to claim 8, wherein the ferromagnetic impurity of is iron or cobalt.

12. A production method of a nanocarbon dispersion liquid, the production method comprising the steps of:
    preparing a mixed liquid containing a carbon nanotube and a medium liquid;
    defibrating the carbon nanotube by applying shear stress to the carbon nanotube; and
    removing a ferromagnetic impurity in the mixed liquid by attracting the impurity to a magnet,
    wherein the mixed liquid includes:
    a medium liquid;
    an emulsification dispersion material; and
    an MWCNT, and
    wherein the mixed liquid further comprises a thickener.

13. The production method according to claim 12, wherein a set of the defibrating step and the removing step is repeated twice or more.

14. The production method according to claim 12, further comprising a step of defibrating the carbon nanotube by applying shear stress to the carbon nanotube after the removing step.

15. The production method according to claim 12, wherein the ferromagnetic impurity of is iron or cobalt.

* * * * *